United States Patent Office 2,827,765
Patented Mar. 25, 1958

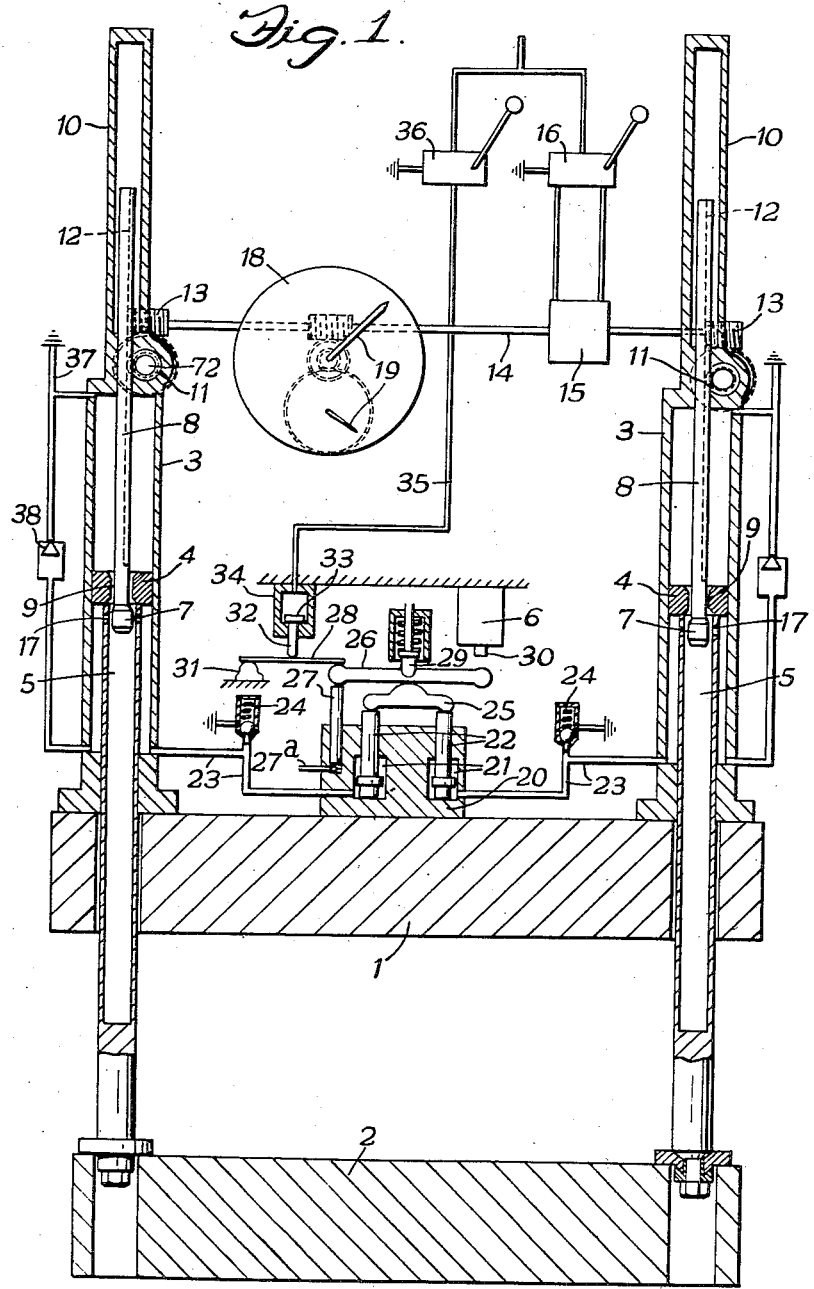

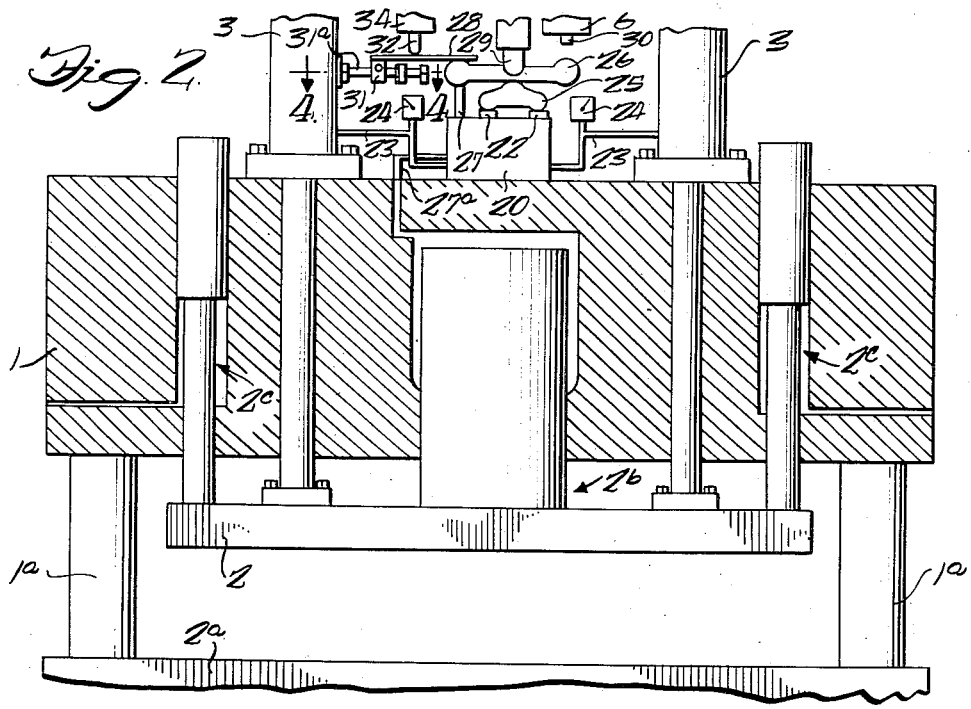

2,827,765

CONTROL GEAR FOR HYDRAULIC PRESSES

John Maurice Towler, Mayfair, London, England, assignor to Electraulic Presses Limited, Rodley, near Leeds, England, a limited liability company of Great Britain Application October 8, 1954, Serial No. 461,190

Claims priority, application Great Britain October 12, 1953

9 Claims. (Cl. 60—52)

This invention relates to control gear for hydraulic presses, particularly for hydraulic forging presses, and has for its object to provide means for limiting the power stroke of the press and for reversing the motion of the table by automatic means so that the press driver may have direct control over the thickness of the work piece.

A further object of the invention is to provide for automatic compensation for tilting of the moving head or table, particularly in a large press, so that the position of the centre of the head or table is controlled rather than the position of one extremity of said head or table.

A still further object of the invention is to provide for compensation for stretch of the press columns and deflection of the movable head or table under varying loads, so that the position of the moving tool carried by said head or table is controlled in relation to that of the fixed tool carried by the anvil or its equivalent and not in relation to a part of the press frame which moves relatively to said fixed tool under varying loads.

A still further object of the invention is to provide the operator with a means for suppressing the action of the automatic control gear, without altering its adjustment, at will.

A still further object of the invention is to provide means which will give a visual indication to the operator when the moving head or table of the press will automatically stop or reverse so that he may have the information necessary to guide him when determining whether this point shall be varied or not by operation of his manual control.

Broadly the invention consists of a control gear for a hydraulic press which will permit the press to operate automatically on a workpiece until the workpiece is reduced to a thickness which has been predetermined by a manual setting of means in the control gear and when said predetermined setting is reached will act to cause the movable head or table of the press to stop or to reverse its motion.

A control gear according to an embodiment of the invention comprises in combination a piston mounted on a piston rod carried by the movable head of the press and working within a control cylinder that is additional to the main cylinder of the press and is carried by the fixed head of the press, means for maintaining said control cylinder full of liquid, a press control valve for controlling the flow of pressure liquid to the main press cylinder to cause the press to stop or reverse its motion, hydraulically operated means for operating said press control valve, means for locking the liquid within the cylinder on one side of the contained piston at a point in the travel of the movable head of the press corresponding to the attainment of a predetermined thickness of the workpiece so that a sudden rise will occur in the pressure of the liquid so trapped, and means whereby said pressure rise is enabled to effect the operation of said press control valve to stop the press from operating on the workpiece.

In a control gear according to the above embodiment one suitable means for locking the liquid within the control cylinder to cause operation of the press control valve when the workpiece has been reduced to a predetermined thickness consists in a by-pass orifice adapted to pass liquid from one side of the control piston to the other as the piston is moving through its cylinder and a valve which closes said orifice when the moving head of the press is in a position where the workpiece is of a predetermined thickness, said valve being adjustable in relation to the by-pass orifice to enable workpieces of varying thicknesses to be produced under the automatic control.

In the above means the by-pass orifice can conveniently be formed in the control piston and the valve for closing the orifice may then be supported in the path of movement of the piston so that the valve and a seating in the orifice will come into sealing contact when the workpiece has been reduced to a thickness which is predetermined by the positional setting of the valve.

A control valve according to the above embodiment when adapted to provide for automatic compensation for tilting of the moving head of the press comprises at least two control cylinders and pistons each in association with an opposite side of the moving press head, a pair of cylinders with plungers separately connected to said control cylinders in the means for actuating the press control valve and compensating means in the form of a rocking lever which contacts both plungers simultaneously and transmits the mean of their motions from a point intermediate the points of contact with the plungers to a further lever to operate the press control valve.

In order that the invention may be clearly understood and carried into effect one practical embodiment will now be described, by way of example, by the aid of the accompanying drawings:

Fig. 1 is a hydraulic circuit diagram showing a control gear according to the present invention and the relationship between the elements of the control gear and those of a hydraulic forging or other press. The particular press shown in similar to and equipped with controls of the type shown in my copending application with Frank H. Towler, Serial No. 288,796, filed May 20, 1952, now Patent No. 2,766,586, and assigned to the same assignee as the present invention.

Fig. 2 is a fragmentary sectional view of the bed portion of the press shown in Fig. 1.

Fig. 3 is a partly diagrammatic view of the rack and pinion adjusting mechanism.

Fig. 4 is a sectional view of the fulcrum support taken on a plane substantially on the line 4—4 of Fig. 2.

As a description of the control gear does not require the press to be fully illustrated only the relevant parts are shown in the accompanying drawing and these consist in the fixed head 1 and movable head 2 of a conventional forging press in which the forging stroke of the movable head 2 is downwards toward the base or bed 2a (Fig. 2). Such forging stroke may be made either by hydraulic pressure exerted through the ram 2b or by gravity and the return stroke by hydraulic pressure exerted through return rams 2c. In the exemplary press, the fixed head 1 is arranged above and rigidly connected to the bed 2a by columns 1a.

With the control gear illustrated the movable head 2 is prevented from applying an effective blow or pressure to the work after said work has been forged or pressed to a predetermined thickness and the means illustrated for attaining this automatic control comprises a pair of control cylinders 3 mounted on and bolted or otherwise anchored to the fixed head 1 so as to stand up vertically from opposite sides of the top of the fixed head 1.

Working slidably in each control cylinder is a piston 4 and these pistons in turn are situated on the upper ends of hollow piston rods 5 which are suitably secured at their lower ends to the movable head 2.

In consequence of this arrangement the rods 5 with their pistons 4 will slide up and down inside the control cylinders 3 as the movable head 2 makes its working and return strokes in relation to a workpiece, not shown, that is positioned beneath it on the base 2a.

By providing a by-pass valve in association with each control cylinder and by assuring that each said cylinder contains liquid on both sides of its piston it is possible to lock the liquid within the control cylinders below the pistons and so act with a press control valve to stop the downward movement of the movable head 2 at any selected position in the down stroke of the pistons. It is also possible to enable the point in the downstroke of the head 2 at which it is stopped to be varied at the will of an operator.

In the embodiment illustrated the above effects are attained by utilising the pressure which is built up within the control cylinder 3 on the underside of the pistons 4 when the liquid therein is locked against escape by closure of the by-pass valves to actuate a press control valve 6. This valve may be a simple open and closed valve of any preferred type connected so as to direct pressure fluid to the regular press control or reversing valve of the press to operate the same and thereby arrest the working stroke of the movable head 2 or to reverse the direction of its motion when the valve 6 is actuated.

The by-pass valves employed in the illustrated embodiment comprise plug valves 7 (Fig. 1) on the lower ends of rods 8. The plug valves are contained within the interiors of the hollow piston rods 5 and the rods 8 which carry them extend upwardly through clearance holes 9 in the pistons 4, through the upper interiors of the control cylinders and into tubular casings 10, the lower ends of which casings form mountings for pinion wheels 11 the teeth on which engage rack teeth 12 cut in the opposing longitudinal sides of the rods 8 as shown in Fig. 3.

By revolving the pinion wheels 11 the plug valves 7 are moved up or down in relation to the pistons 4 and such actuation, in the example illustrated, is made through a worm and worm wheel drive 13 by revolving a transverse shaft 14 by means of a hydraulic motor 15 which is supplied with operating pressure liquid at the will of an operator by manual manipulation of a control valve 16 (Fig. 1).

The plug valves 7 are dimensioned for a sliding fit in the holes 9 in the pistons 4 and the downward stroke of the movable head 2 results in the said pistons being brought into sealing contact with the aforesaid plug valves. After such contact takes place and upon further relative movement of the pistons and plug valves, the liquid contained within the portions of the control cylinders below the pistons 4, and which is normally free to escape into the hollow piston rods 5 through radial holes 17 and through the clearance holes 9 in the pistons 4 into the interiors of the control cylinders above the said pistons, is now trapped beneath the pistons. This immediately checks the downward movement of the pistons 4 and raises the pressure of the trapped liquid and by means now to be described this pressure increase is utilised to operate the press control valve 6, which, in turn, directs pressure fluid to an appropriate valve of the press control system to cause the working stroke of the movable head 2 to be arrested or to have the direction of its motion reversed.

It will thus be seen that the point in the working stroke of the movable part of the press at which such arrest or reversal occurs is related to the position of the plug valves 7 within the control cylinders, so that by varying the position of said plug valves the operator is enabled to set the press to operate automatically to forge or press workpieces to selected thicknesses. By providing a dial 18 with pointers 19 movable over it upon actuation of the shaft 14 through suitable gearing 19a a visible indication is given of the point in the working stroke of the press at which the control gear is set to operate.

As previously explained one of the objects of the present invention is to enable automatic compensation to be provided for any tilting which may take place of the moving head or table of a large press so that the position of the centre of the moving head in relation to the fixed head may be controlled. Also it is desirable that compensation may be provided for stretch of the press columns 1a and deflection of the movable head or table 2 under varying load so that the position of the moving head is controlled in relation to the fixed head.

The above effects are attained in the illustrated example by means comprising an actuator 20 the body of which is bored to provide two actuator cylinders 21 (Fig. 1) containing plungers 22 having relatively short strokes, said actuator cylinders being permanently connected at their lower ends to the liquid within the lower ends of the control cylinders 3 by pipes 23. Each said pipe has in its length a relief valve 24 to safeguard each of the control cylinders against overpressure.

Immediately sealing contact is made between the plug valves 7 and the seatings at the lower ends of the clearance holes 9 in the pistons 4, the pressure rise in the liquid trapped below the pistons forces the plunger 22 outwards or, in the illustration, upwards and this motion is employed to actuate the press control valve 6 through compensating levers comprising a rocking lever 25, which at its ends makes contact with the outer or upper ends of the plungers 22, and through a central hump or protuberance on its upper edge with the underside of a lever 26.

The lever 26 is supported at one end by the upper end of a plunger 27 the inner end of which is in permanent communication with the pressure within the press cylinder, Fig. 2, by means of a pipe 27ª, the outward movement of said plunger due to the pressure within the press cylinder being resisted by a blade spring 28.

The fulcrum of the lever 26 is formed by a pivotal attachment to the lower end of a spring loaded plunger 29 and the free end of said lever 26 is beneath the projecting end of the operating pin 30 of the press control valve 6. The blade spring 28 is supported at its outer end upon a fulcrum 31 in the form of a bar mounted adjustment along the length of the spring upon a pair of studs 31a extending laterally from one of the cylinders 3 as shown in Figs. 2 and 4. Adjustment of the fulcrum may be effected in any preferred manner as by a screw 32a threaded through a cross member 33a carried by the studs 31a and rotatably anchored at its inner end to the fulcrum. Between its ends the spring 28 bears against the lower end of a plunger 32. This plunger has an enlarged head 33 which is reciprocable within a cylinder 34 to which pressure liquid is admissible above the head 33 through a pipe 35 under the manual control of an operator through a control valve 36 to hold the plunger in the position shown where it can function as a further fulcrum for the blade spring 28.

The plunger 32 provides a means whereby the control gear may be put out of action by the operator without altering its adjustment and this simply is effected by an operation of the control valve 36 to shut off the supply of pressure liquid to the cylinder 34 to allow the contacting end of the lever 26 to move freely and thus prevent its opposite end from actuating the pin 30 of the press control valve 6 as the said lever 26 is lifted by the plungers 22.

By moving the fulcrum 31 along the length of the blade spring 28 the effective resilience of the spring at its opposite end where it is engaged by the lever 26 may be varied to compensate for any stretch of the press columns and deflection of the movable head under varying loads.

The purpose of the plunger 27 is to deflect the spring blade 28 and as the said plunger is always subject to the pressure in the press cylinder and as any deflection of the press frame will be proportional to the force applied by the press ram the plunger 27 simulates the same deflection on the spring blade 28 and this deflection is used in the valve gear to compensate for the deflection in the press frame.

As previously explained, on the downstroke of the pistons 4 the liquid within the lower ends of the control cylinders passes to the opposite sides of the pistons by way of the clearance holes 9. So that the return stroke of the pistons 4 shall be made as freely as possible a pipe 37 is provided to connect the interiors of the control cylinders on opposite sides of the pistons and in each such pipe 37 is fitted a non-return valve 38 which acts to prevent the passage of liquid only during the down stroke of the pistons. By means of the clearance holes 9 and the pipes 37 the cylinders 3 are maintained filled with liquid on both sides of the pistons during movement of the pistons in both directions.

In operating a hydraulic press with a control gear according to the embodiment of the invention above described the operator sets the plug valves 7 to a position corresponding to the required finished thickness of the workpiece. The movable head 2 will then continue to operate on the workpiece until the resulting gradual reduction in its thickness permits the pistons 4 in the control cylinders 3 to descend to the level at which the plug valves engage the seatings on the lower ends of the clearance holes 9 in the pistons 4 and so bring about the actuation of the press control valve 6 by locking liquid within the control cylinders beneath the said pistons.

What is claimed is:

1. A control gear for a hydraulic press having a fixed head and a head movable by a main press cylinder to operate on a workpiece until the same is reduced to a predetermined thickness, said control gear comprising, in combination, a piston mounted on a piston rod carried by the movable head of the press, a control cylinder for said piston carried by the fixed head of the press, means for maintaining said control cylinder full of liquid, a press control valve, means for locking the liquid in said control cylinder on one side of the piston, said locking means being operable at a point in the travel of the movable head corersponding to the attainment of a predetermined thickness of the workpiece so that a sudden rise will occur in the pressure of the liquid located in the cylinder, and means operative in response to such pressure rise to effect the operation of said press control valve.

2. A control gear for a hydraulic press having a power actuated reciprocable head and a control valve for regulating operation of the head, said control gear comprising, in combination, a stationary liquid filled cylinder, a piston reciprocable in said cylinder, means connecting said piston to the press head for reciprocation therewith, means defining a passage connecting opposite ends of said cylinder for the transfer of liquid from one side of said piston to the other in the reciprocation of the piston, valve means operable to close said passage and thereby trap the liquid therein and condition said plunger to pressurize the liquid in one end of the cylinder, and means operable responsive to a predetermined pressure rise in said one end of the cylinder for operating the control valve.

3. A control gear for a hydraulic press having a power actuated reciprocable head and a control valve for regulating operation of the head, said control gear comprising, in combination, a stationary liquid filled cylinder, a piston reciprocable in said cylinder, means connecting said piston to the press head for reciprocation therewith, means defining a passage connecting opposite ends of said cylinder for the transfer of liquid from one side of said piston to the other in the reciprocation of the piston, valve means operable in timed relation to the reciprocation of the head to close said passage and thereby trap the liquid in one end of the cylinder to be pressurized by said piston in the continued movement of the head, said valve means being adjustable to effect such closure at any selected position of the head, and pressure operated means operable by the liquid pressurized in said cylinder for operating the control valve.

4. Control gear as defined in claim 3, including means for disabling said pressure operated means while maintaining the adjustment of said valve means.

5. Control gear for a hydraulic press having a power actuated head and a valve controlling the operation of the head, said control gear comprising, in combination, a stationary liquid filled cylinder, a piston reciprocable in said cylinder connected to and movable with the head, said piston having a passageway permitting passage of fluid from one end of the cylinder to the other as the piston reciprocates in the cylinder, a stationary rod extending through said cylinder and said piston port, said rod having a valve element adjacent one end operative upon movement of the press head and said piston to a predetermined position for closing said passageway to trap liquid in the ends of the cylinder, said piston acting to pressurize the fluid in one end of the cylinder upon further movement of the press head, and control mechanism operable by the pressurized fluid for actuating the control valve.

6. Control gear for a hydraulic press as defined in claim 5, including adjusting means for shifting said rod axially to determine the position of the press head at which said valve element closes said port.

7. Control gear for a hydraulic press as defined in claim 5, including a control device operable by the pressure of the fluid actuating the press head for modifying the action of said control mechanism proportional to the force applied to the press head.

8. Control gear for a hydraulic press having a movable head and a control valve for regulating the movements of the head, said control gear comprising, in combination, means for compensating for tilting of the press head under load including a rocking lever supported in operative relation to the control valve, a pair of actuator cylinders disposed opposite adjacent ends of said lever, plungers in said cylinders respectively engaging opposite ends of said lever, fluid filled control cylinders opposite adjacent ends of the head, pistons connected to the head and reciprocable in said cylinders to force fluid therefrom to the respective actuator cylinders in amounts corresponding to the extent of movement of the respective pistons.

9. Control gear for a hydraulic press having a pressure actuated head and valve means controlling the actuation of the head, said control gear comprising, in combination, a stationary liquid filled cylinder, a piston in said cylinder connected with the head and reciprocable with the cylinder incident to the movements of the head, means defining a passage connecting opposite ends of said cylinder to permit flow of liquid from one end of the cylinder to the other as said piston reciprocates therein, a valve operable to close said passage for pressurizing the fluid in one end of said cylinder, a control device operated by the fluid pressurized in said cylinder, a linkage connecting said control device with the head controlling valve means for operation of the latter, and means responsive to the pressure of the fluid actuating the head for effecting a compensating adjustment of said linkage.

References Cited in the file of this patent

UNITED STATES PATENTS

| | | |
|---|---|---|
| 2,302,132 | MacMillin et al. | Nov. 17, 1932 |
| 2,317,563 | Tucker | Apr. 27, 1943 |
| 2,343,167 | Bench | Feb. 29, 1944 |
| 2,400,685 | Collins | May 21, 1946 |